United States Patent
Li et al.

(10) Patent No.: US 8,150,211 B2
(45) Date of Patent: Apr. 3, 2012

(54) IDENTIFYING PATTERNS IN DATA

(75) Inventors: Wenlong Li, Beijing (CN); Jianguo Li, Beijing (CN); Tao Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1057 days.

(21) Appl. No.: 12/075,527

(22) Filed: Mar. 12, 2008

(65) Prior Publication Data
US 2009/0232414 A1    Sep. 17, 2009

(51) Int. Cl.
*G06K 9/40* (2006.01)

(52) U.S. Cl. ........ 382/289; 382/260; 382/274; 382/275; 358/3.26; 358/3.27; 358/463

(58) Field of Classification Search .................. 382/282, 382/289, 291; 358/3.26, 3.27, 463
See application file for complete search history.

(56) References Cited

U.S. PATENT DOCUMENTS

| 5,063,604 | A | | 11/1991 | Weiman | |
|---|---|---|---|---|---|
| 5,638,465 | A | * | 6/1997 | Sano et al. | 382/281 |
| 6,263,089 | B1 | * | 7/2001 | Otsuka et al. | 382/107 |
| 6,674,919 | B1 | * | 1/2004 | Ma et al. | 382/289 |
| 7,119,924 | B2 | * | 10/2006 | Prabhakar et al. | 358/1.9 |
| 7,365,325 | B2 | * | 4/2008 | Miyamoto et al. | 250/311 |

* cited by examiner

*Primary Examiner* — Yosef Kassa
(74) *Attorney, Agent, or Firm* — Trop, Pruner & Hu, P.C.

(57) ABSTRACT

An image feature within image data may be identified and located from the maximum values in a Hough voting table. The Hough voting table may be generated by converting edge pixels identified with an image data into an array. The array may be read in row order with theta on the outside loop and rho on the inside loop. In some embodiments, the storage requirements for the Hough voting table may be reduced.

15 Claims, 3 Drawing Sheets

IDENTIFYING PATTERNS IN DATA

BACKGROUND

This relates generally to the process of identifying patterns in data. It may include the detection of lines in image data, computer vision, pattern recognition, and object detection.

In a wide variety of applications, it is desirable to identify patterns within data. In the physical world, the patterns within data may represent image elements in a pictorial image in digital format. Certain features in the image may be extracted for identification of the depicted objects. This may be useful in a wide variety of applications, including medical imaging, detecting objects in images, and generally in image analysis.

One technique for image analysis in computer vision is the Hough Transform. It recognizes global patterns in an image spaced by identifying local patterns in a transformed parameter space. The transformed parameter space is known as a Hough voting table. In the Hough Transform, curves are identified that can be parameters like straight lines, polynomials, circles, ellipses, parabolas, etc. in a suitable parameter space. Therefore, detecting the curves reduces to detecting local maxima in the parameter space to which a large number of pixels are mapped. One advantage of the Hough Transform is the robustness to discontinuous pixels and noise in real world images.

DETAILED DESCRIPTION

One problem with the use of the Hough Transform is that there is a very large amount of computation in pixel transformation. In addition, a large amount of storage may be required for the voted parameter space. Both the storage requirements and the computation requirements increase linearly with image size. Thus, it is very difficult to use a Hough Transform to achieve real time processing on high resolution images, including those associated with high definition television (HDTV).

In accordance with some embodiments of the present invention, a Hough Transform algorithm produces better memory system performance in terms of cache miss rate, memory bandwidth requirements, and memory access latency. In addition, in some embodiments, the algorithm is lock-free. It may improve data locality and improve memory subsystem performance, while increasing the parallel scaling performing to realize multi-core and many-core processors effectively.

Figure 2:
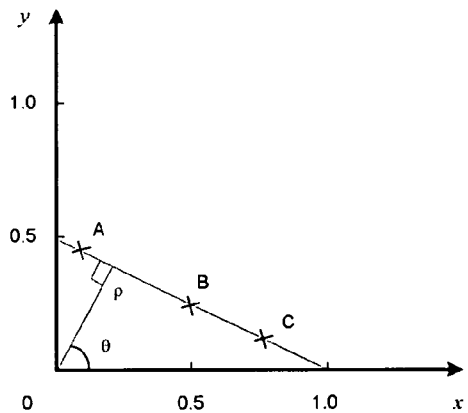
FIG. 2 is a depiction of an example curve in Cartesian coordinate space.
Figure 3:
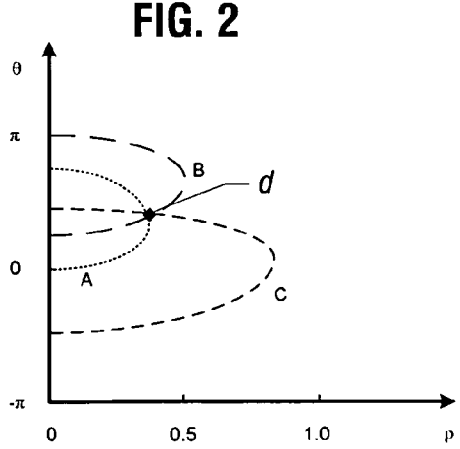
FIG. 3 is a graph of the same information in the Hough Transform space.

Referring to FIG. 2, in the Cartesian coordinate space, the points a, b, and c may be identified by their coordinates in x and y axes. If the points a, b, and c lie on the same line, they may be specified by an angle theta from the x axis and by a distance rho from the origin to that line, all as indicated in FIG. 2. Then the points may be transformed to the Hough plane specified in terms of rho as the horizontal axis and theta as the vertical axis, as shown in FIG. 3. The letter d indicates where the three points overlap in the Hough plane. The transformation from Cartesian to Hough plane may be done using the mapping function rho is equal to $x \cos \theta + y \sin \theta$.

Figure 1:
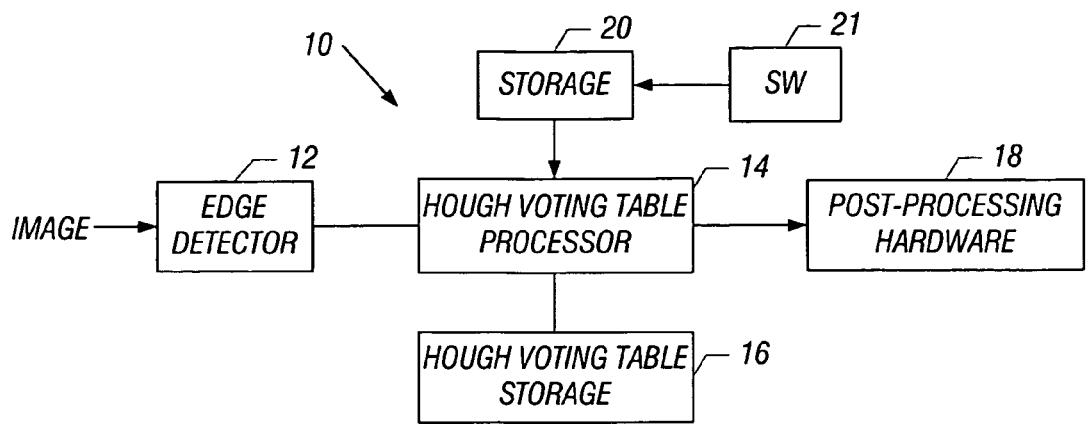
FIG. 1 is a system depiction for one embodiment.

Referring to the hardware depiction in FIG. 1, image data may be received by an edge detector 12, which is part of a data analysis system 10. The input image is then subjected to edge detection or binarization by the edge detector 12 in FIG. 1. The array may be stored with a Hough voting table processor 14 (FIG. 1), in accordance with some embodiments, but, in other embodiments, may be stored in a separate dedicated storage 16 (FIG. 1) for that purpose.

The initialized Hough voting table may be stored in a storage 16, coupled to the processor 14. In some embodiments, the processor 14 may be a multi-core processor. A sequence of operations may be implemented by software 21, in one embodiment, stored on storage 20.

Figure 4:
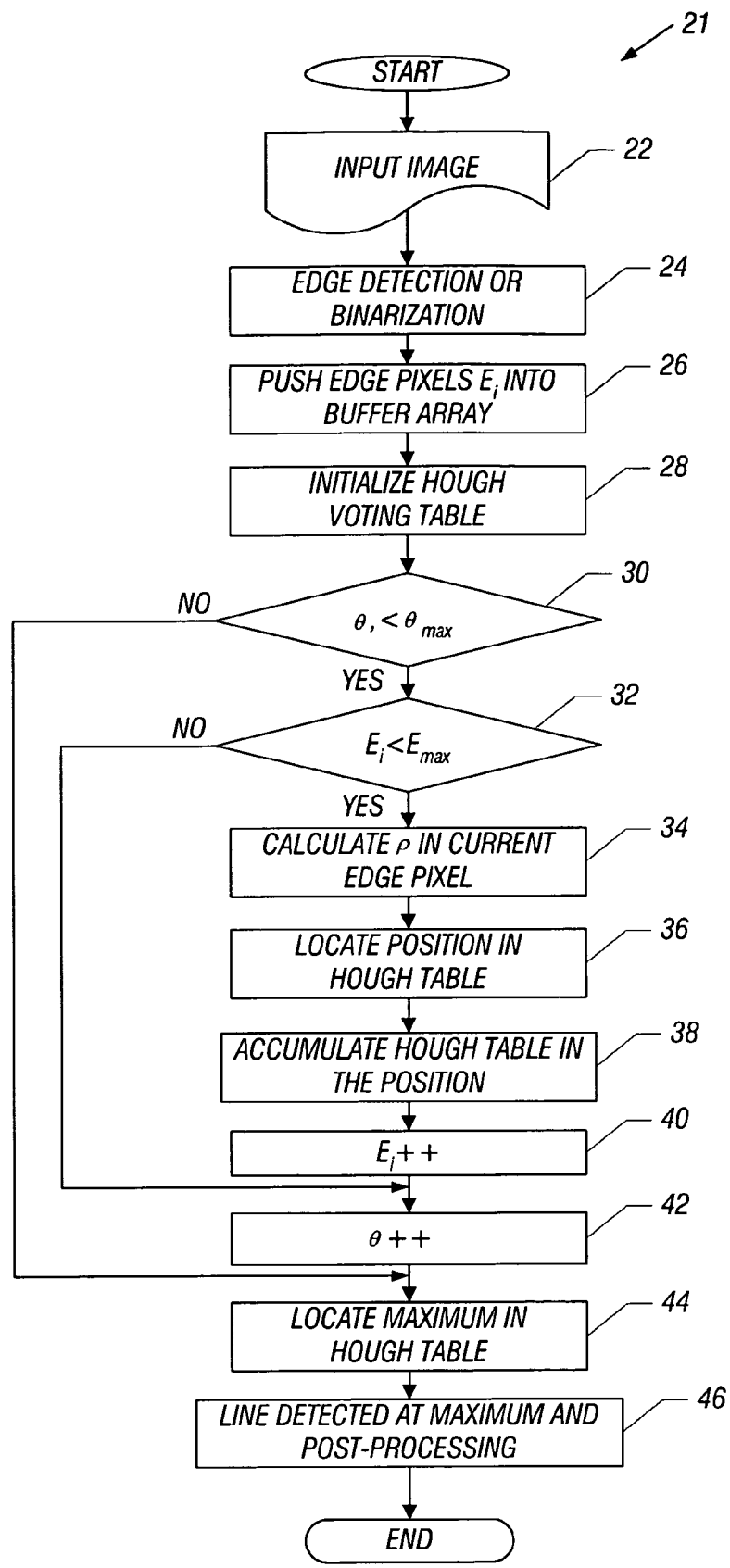
FIG. 4 is a flow chart in accordance with one embodiment of the present invention.

The sequence 21 is illustrated in FIG. 4. An input image is received for analysis at 27. Then edges are located within the image using edge detection or binarization (block 24). The identified edge pixels $E_i$ are loaded into a buffer array at block 26. Then a Hough voting table is initialized (block 28).

Next, the Hough table is built up by operating two nested loops. The outside loop is initiated at decision point 30 which checks whether theta is less than the maximum theta. As long as it is, the outside loop continues to iterate through point 42. The first iteration begins an inside loop at decision point 32, which checks to determine whether there are still more edge pixels in the buffer array. The inside loop 32 iterates through the point 40. The inside loop calculates rho in the current edge pixel at block 34. Then it locates a position in the Hough voting table at block 36. The Hough voting table count is accumulated in the position at block 38 and the flow continues to iterate at 40 until all of the edge pixels have been analyzed.

After iterating through the inside and outside loops (the outside loop ends at point 42), the maxima are located in the Hough voting table at 44. The processing may be completed in the hardware in FIG. 1 through the Hough voting table processor 14. It may be operated by the sequence 21, in the form of software stored in the storage 20, in one embodiment, which storage may be external to or part of the processor 14.

After the Hough voting table processor 21 has completed the Hough Transform, the information may be provided for post-processing hardware 18. The line detected at a maximum at block 46 in FIG. 4 is then subjected to post-processing, which could be image analysis, object detection, computer vision operations, or pattern recognition, to mention a few examples.

The algorithm accesses the Hough table accumulation in the order of rho, on the inside loop, and theta, on the outside loop, which enables good data locality and delivers good memory system performance. This may be done by packing the non-zero edge pixels into a new array and reading them in rho order. Each inside loop has the same theta parameter and all edge pixels are mapped into the same rho of the Hough voting table, providing good temporal data locality. The algorithm traverses the Hough voting table in row order or one row at a time before going to the next row, as the theta loop is on the outside, so good spatial data locality may be achieved.

In accordance with one embodiment, the following code may be implemented:

```
int ImageSize = width * height;
int MaxEdgePixelSize = ImageSize/5;
int* EdgePixels;
CV_CALL(EdgePixels = (int*)cvAlloc( sizeof(int)*
MaxEdgePixelSize));
int EdgePixelSize = 0;
// push edge pixels into stack
for(i = 0; i < ImageSize; i++)
{
    //store edge pixel to buffer
    if(BinImage[i] !=0 && EdgePixelSize+2 < MaxEdgePixelSize)
    {
        int y = i / WidthStep;
        int x = i % WidthStep;
        EdgePixels[EdgePixelSize++] = y - HALF_HEIGHT;
        EdgePixels[EdgePixelSize++] = x - HALF_WIDTH;
    }
}
int HoughSize = numangle * numrho;
CV_CALL(accum = (int*)cvAlloc( sizeof(accum[0])* HoughSize ));
// initial Hough voting table
memset( accum, 0, sizeof(accum[0]) * HoughSize );
// Hough voting procedure
for(int k = 0; k < MaxTheta; k++) //Theta
{
    for(int m = 0; m < EdgePixelSize; m+=2) // loop edge pixels
    {
        int y = EdgePixels[m];
        int x = EdgePixels[m+1];
        int rho = ( y*tabSine[k]+x *tabCos[k])+ MaxRho;
        int position = k* RhoSize + rho;
        // assert( rline > 0 && rline < HoughSize);
        accum[position]++;
    }
}
```

The algorithm may also be lock-free when parallelizing for many core processors. The parallel implementation, shown below, allows each thread to access only one rho of the Hough voting table and different threads have different theta values.

```
int ImageSize = width * height;
int MaxEdgePixelSize = ImageSize/5;
int* EdgePixels;
CV_CALL(EdgePixels = (int*)cvAlloc( sizeof(int)*
MaxEdgePixelSize));
int EdgePixelSize = 0;
// push edge pixels into stack
for(i = 0; i < ImageSize; i++)
{
    //store edge pixel to buffer
    if(BinImage[i] !=0 && EdgePixelSize+2 < MaxEdgePixelSize)
    {
        int y = i / WidthStep;
        int x = i % WidthStep;
        EdgePixels[EdgePixelSize++] = y - HALF_HEIGHT;
        EdgePixels[EdgePixelSize++] = x - HALF_WIDTH;
    }
}
int HoughSize = numangle * numrho;
CV_CALL(accum = (int*)cvAlloc( sizeof(accum[0])* HoughSize ));
// initial Hough voting table
memset( accum, 0, sizeof(accum[0]) * HoughSize );
#pragma omp parallel for static(1)
for(int k = 0; k < MaxTheta; k++) //Theta
{
    for(int m = 0; m < EdgePixelSize; m+=2)
    {
        int y = EdgePixels[m];
        int x = EdgePixels[m+1];
        int rho = (y*tabSine[k]+x*tabCos [k]) + MaxRho;
        int position = k* RhoSize + rho;
        // assert( rline > 0 && rline < HoughSize);
        accum[position]++;
    }
}
```

Figure 5:
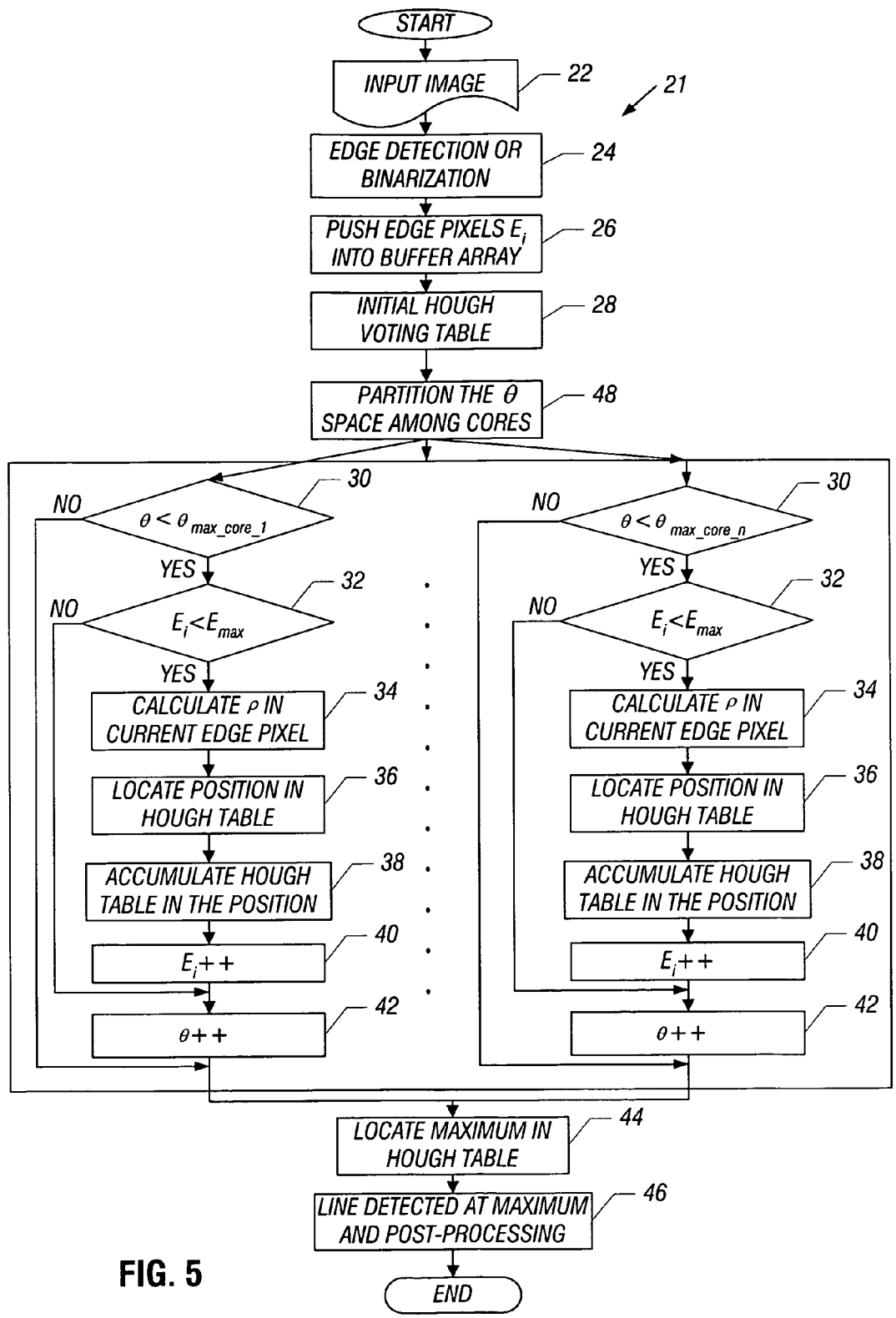
FIG. 5 is a flow chart for a multi-core embodiment.

Referring to FIG. 5, the algorithm of FIG. 4 may be iterated a number of times, once for each core. At block 48, the theta space is first partitioned among the cores. Then, the sequence of FIG. 4 is undertaken for each core through block 42. Thereafter, the maximum is located, for all cores, in the Hough voting table (block 44) and a line is detected at the maximum and used for post-processing in block 46.

The Hough voting table is partitioned among the threads and not read-write shared. Therefore, the parallel implementation may be lock-free in some embodiments.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
receiving image data;
detecting edge pixels within the image data;
converting the pixels to a Hough plane in terms of rho and theta;
packing the pixels into an array;
reading the array in row order with theta on an outside loop and rho on an inside loop; and
detecting a feature in the image data from the maximum values in a Hough voting table,
wherein theta measures an angle from the x axis and rho measures a distance from the origin in a Cartesian coordinate space.

2. The method of claim 1 including locating the maximum values in the Hough voting table by iterating through two loops, a first loop iterating until theta reaches a maximum and inside loop iterating through the calculation of rho in each edge pixel.

3. The method of claim 2 including locating a position in the Hough voting table and accumulating the Hough voting table in the position.

4. The method of claim 1 including partitioning theta among a plurality of cores and iterating through each core.

5. The method of claim 4 including locating the maximum in a Hough voting table from all the cores.

6. The method of claim 1 including executing a pair of loops, one inside the other, said inside loop having the same theta parameter and all edge pixels being mapped into the same row of the Hough voting table.

7. The method of claim 1 including traversing the Hough voting table in row order with theta being calculated in an outside loop.

8. The method of claim 1 including calculating the Hough voting table maximum, without locks, on a many core processor.

9. A non-transitory computer readable medium storing instructions to cause the computer to:
   transform image data to a Hough plane including rho and theta;
   read an array including rho and theta values for the image data in row order;
   accumulate a Hough voting table by analyzing theta in an outside loop and rho in an inside loop; and
   locate an image feature from within the image data using the maximum values in a Hough voting table,
   wherein theta measures an angle from the x axis and rho measures a distance from the origin in a Cartesian coordinate space.

10. The medium of claim 9 including instructions to iterate through a first loop until theta reaches a maximum and iterate through a second loop within the first loop through the calculation of rho.

11. The medium of claim 10 storing instructions to locate a position in a Hough voting table and accumulate the Hough voting table in the position.

12. The medium of claim 9 further storing instructions to partition theta among a plurality of cores and to iterate through each core.

13. The medium of claim 12 further storing instructions to locate the maximum in a Hough voting table from all of the cores.

14. The medium of claim 9 further storing instructions to execute a pair of loops, one loop inside the other loop, said inside loop having the same theta parameter.

15. The medium of claim 14 further storing instructions to map a plurality of edge pixels into the same row of a Hough voting table.

* * * * *